(12) United States Patent
Schneider

(10) Patent No.: US 6,678,717 B1
(45) Date of Patent: *Jan. 13, 2004

(54) METHOD, PRODUCT, AND APPARATUS FOR REQUESTING A NETWORK RESOURCE

(76) Inventor: Eric Schneider, 13944 Cedar Rd. #258, University Heights, OH (US) 44118

( * ) Notice: Subject to any disclaimer, the term of this patent is extended or adjusted under 35 U.S.C. 154(b) by 4 days.

This patent is subject to a terminal disclaimer.

(21) Appl. No.: 09/683,465

(22) Filed: Jan. 3, 2002

Related U.S. Application Data

(63) Continuation of application No. 09/525,350, filed on Mar. 15, 2000, now Pat. No. 6,338,082.
(60) Provisional application No. 60/175,825, filed on Jan. 15, 2000, provisional application No. 60/160,125, filed on Oct. 18, 1999, provisional application No. 60/157,075, filed on Oct. 1, 1999, provisional application No. 60/130,136, filed on Apr. 20, 1999, and provisional application No. 60/125,531, filed on Mar. 22, 1999.

(51) Int. Cl.[7] .............................................. G06F 13/00
(52) U.S. Cl. .................. 709/203; 709/217; 709/219
(58) Field of Search ................. 709/200, 201, 709/203, 217, 218, 219, 220, 221, 224, 226, 227, 229, 245

(56) References Cited

U.S. PATENT DOCUMENTS

| | | | |
|---|---|---|---|
| 5,764,906 A | 6/1998 | Edelstein et al. | 709/219 |
| 5,812,776 A | 9/1998 | Gifford | 709/217 |
| 5,974,453 A | 10/1999 | Andersen et al. | 709/220 |
| 5,978,817 A | 11/1999 | Giannandrea et al. | 707/501.1 |
| 5,978,842 A | 11/1999 | Noble et al. | 709/218 |
| 6,009,459 A | 12/1999 | Belfiore et al. | 709/203 |
| 6,014,660 A | 1/2000 | Lim et al. | 707/3 |
| 6,023,724 A | 2/2000 | Bhatia et al. | 709/218 |
| 6,041,324 A | 3/2000 | Earl et al. | 707/9 |
| 6,061,738 A | 5/2000 | Osaku et al. | 709/245 |
| 6,085,242 A | 7/2000 | Chandra | 709/223 |
| 6,092,100 A | 7/2000 | Berstis et al. | 709/203 |
| 6,119,234 A | 9/2000 | Aziz et al. | 713/201 |
| 6,134,588 A | 10/2000 | Guenthner et al. | 709/226 |
| 6,148,289 A | 11/2000 | Virdy | 707/3 |
| 6,151,624 A | 11/2000 | Teare et al. | 709/217 |
| 6,154,777 A | 11/2000 | Ebrahim | 709/227 |
| 6,167,449 A * | 12/2000 | Arnold et al. | 709/227 |
| 6,182,148 B1 | 1/2001 | Tout | 709/245 |
| 6,202,087 B1 | 3/2001 | Gadish | 709/206 |
| 6,212,565 B1 | 4/2001 | Gupta | 709/229 |
| 6,314,469 B1 * | 11/2001 | Tan et al. | 709/245 |
| 6,338,082 B1 * | 1/2002 | Schneider | 709/203 |
| 6,442,549 B1 | 8/2002 | Schneider | 707/10 |
| 6,560,634 B1 * | 5/2003 | Broadhurst | 709/203 |

OTHER PUBLICATIONS

Playing monopoly, Wasserman, Elizabeth, The industry Standard, Jan. 25, 1999, p31.*
Web page of Network Solutions.*
Mockapetris P., "RFC 1034: Domain Names—Concepts and Facilities" Section 4.3.3, IETF, Nov. 1987, <http://www.faqs.org/rfcs/rfc1034.html>.

* cited by examiner

*Primary Examiner*—Moustafa M. Meky

(57) ABSTRACT

When a network resource request having a domain name is received, it is determined whether the network resource can be located including determining whether the domain name is resolvable. Rather than, or in addition to, displaying an error message or processing a search request in response to determining that a network resource can not be located or of an unresolvable domain name, the domain name can instead be redirected to a registration service where the domain name may automatically be used to perform a registration request and determine domain name availability. When the domain name is not available for registration, domain name registrant information is provided. However, when the domain name is determined available, a registration form is provided. For example, such a domain name in question may be redirected from the autosearch feature of a web browser to a service, which determines that the domain name is available for registration enabling a potential registrant to register the available domain name by selecting a domain name registration provider from a list of domain name registration providers.

26 Claims, 8 Drawing Sheets

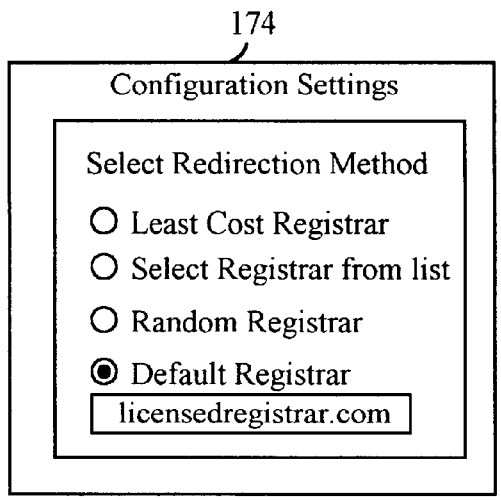
*Fig. 5a*
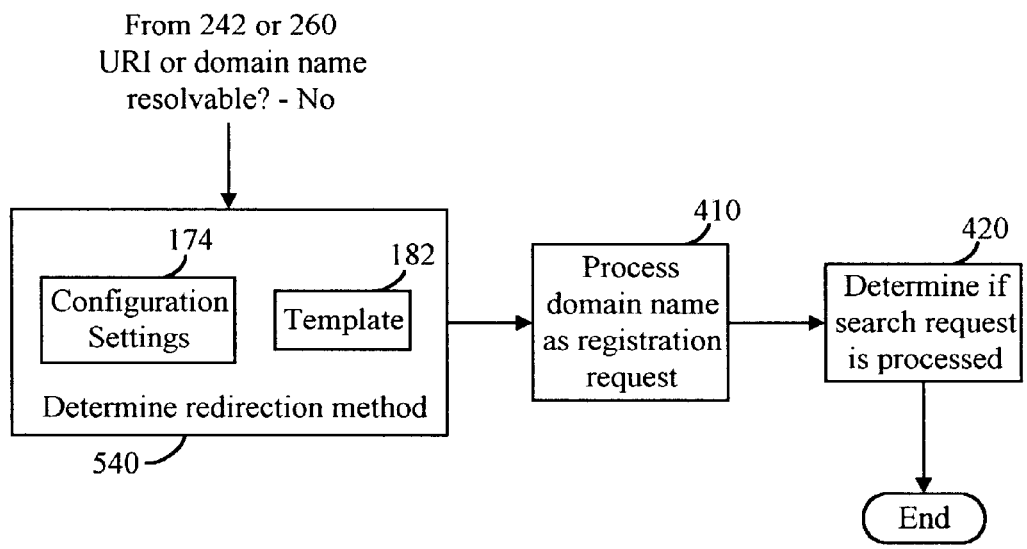
*Fig. 5b*
*Fig. 5c*

METHOD, PRODUCT, AND APPARATUS FOR REQUESTING A NETWORK RESOURCE

CROSS REFERENCE TO RELATED APPLICATIONS

The application is a continuation of U.S. patent application Ser. No. 09/525,350 filed Mar. 15, 2000, now U.S. Pat. No. 6,338,082, by Schneider, entitled "Method, product, and apparatus for requesting a network resource", which claims the benefit of U.S. Provisional Application Ser. No. 60/175,825 filed Jan. 13, 2000, by Schneider, now abandoned, U.S. Provisional Application Ser. No. 60/160,125 filed Oct. 18, 1999, by Schneider, now abandoned, U.S. Provisional Application Ser. No. 60/157,075 filed Oct. 1, 1999, by Schneider, now abandoned, U.S. Provisional Application Ser. No. 60/130,136 filed Apr. 20, 1999, by Schneider, now abandoned, and U.S. Provisional Application Ser. No. 60/125,531 filed Mar. 22, 1999, by Schneider, now abandoned.

BACKGROUND OF INVENTION

1. Field of the Invention

This invention generally relates to navigation services and registration services, and more specifically relates to a method, product, and apparatus for integrating resource location and registration services.

2. Description of the Related Art

The Internet is a vast computer network having many smaller networks that span the world. A network provides a distributed communicating system of computers that are interconnected by various electronic communication links and computer software protocols. Because of the Internet's distributed and open network architecture, it is possible to transfer data from one computer to any other computer world wide. In 1991, the World-Wide-Web (Web or WWW) revolutionized the way information is managed and distributed through the Internet.

The Web is based on the concept of hypertext and a transfer method known as Hypertext Transfer Protocol (HTTP) which is designed to run primarily over a Transmission Control Protocol/Internet Protocol (TCP/IP) connection that employs a standard Internet setup. A server computer may provide the data and a client computer may display or process it. TCP may then convert messages into streams of packets at the source, then reassembles them back into messages at the destination. Internet Protocol (IP) handles addressing, seeing to it that packets are routed across multiple nodes and even across multiple networks with multiple standards. HTTP protocol permits client systems connected to the Internet to access independent and geographically scattered server systems also connected to the Internet. Client side browsers, such as Netscape Navigator or Microsoft Internet Explorer, provide efficient graphical user interface (GUI) based client applications that implement the client side portion of the HTTP protocol. One format for information transfer is to create documents using Hypertext Markup Language (HTML). HTML pages are made up of standard text as well as formatting codes that indicate how the page should be displayed. The client side browser reads these codes in order to display the page.

A web page is static when it requires no variables to display information or link to other predetermined web pages. A web page is dynamic when arguments are passed which are either hidden in the web page or entered from the client browser to supply the necessary inputs displayed on the web page. Common Gateway Interface (CGI) is a standard for running external programs from a web server. CGI specifies how to pass arguments to the executing program as part of the HTTP server request. Commonly, a CGI script can take the name and value arguments from an input form of a first web page which is be used as a query to access a database server and generate an HTML web page with customized data results as output that is passed back to the client browser for display.

The Web is a means of accessing information on the Internet that allows a user to "surf the web" and navigate the Internet resources intuitively, without technical knowledge. The Web dispenses with command-line utilities, which typically require a user to transmit sets of commands to communicate with an Internet server. Instead, the Web is made up of millions of interconnected web pages, or documents, which can be displayed on a computer monitor. Hosts running special servers provide the Web pages. Software that runs these Web servers is relatively simple and is available on a wide range of computer platforms including PC's. Equally available is a form of client software, known as a Web browser, which is used to display Web pages as well as traditional non-Web files on the client system.

A network resource identifier such as a Uniform Resource Identifier (URI) is a compact string of characters for identifying an abstract or physical resource. URIs are the generic set of all names and addresses that refer to objects on the Internet. URIs that refer to objects accessed with existing protocols are known as Uniform Resource Locators (URLs). A URL is the address of a file accessible on the Internet. The URL contains the name of the protocol required to access the resource, a domain name, or IP address that identifies a specific computer on the Internet, and a hierarchical description of a file location on the computer. For example the URL "http://www.example.com/index.html", where "http" is the scheme or protocol, "www.example.com" is the Fully Qualified Domain Name (FQDN), and "index.html" is the filename located on the server.

Because an Internet address is a relatively long string of numbers (e.g., 31.41.59.26) that is difficult to remember, Internet users rely on domain names, memorable and sometimes catchy words corresponding to these numbers, in order to use electronic mail (e-mail) and to connect to Internet sites on the Web. The Domain Name System (DNS) is a set of protocols and services on a network that allows users to utilize domain names when looking for other hosts (e.g., computers) on the network. The DNS is composed of a distributed database of names. The names in the DNS database establish a logical tree structure called the domain name space. Each node or domain in the domain name space is named and can contain subdomains. Domains and subdomains are grouped into zones to allow for distributed administration of the name space.

The DNS provides a mechanism so backup databases can be identified in case the first one becomes unavailable. DNS databases are updated automatically so that information on one name server does not remain out-of-date for long. A client of the DNS is called a resolver; resolvers are typically located in the application layer of the networking software of each TCP/IP capable machine. Users typically do not interact directly with the resolver. Resolvers query the DNS by directing queries at name servers, which contain parts of the distributed database that is accessed by using the DNS protocols to translate domain names into IP addresses needed for transmission of information across the network.

The Berkeley Internet Name Domain (BIND) implements an Internet name server for the UNIX operating system. The BIND consists of a name server and a resolver library. BIND is fully integrated into UNIX network programs for use in storing and retrieving host names and addresses by calling a routine from the resolver library called gethostbyname( ) which returns the IP address corresponding to a given Internet host name. Error return status from gethostbyname( ) is indicated by return of a NULL pointer.

At the heart of Netscape client products lies the Netscape Network Library (netlib). A necessity of any network based client browser application is to send and receive data over a connection. This is accomplished in netlib by making a call to NET_GetURL( ). Among NET_GetURL( )'s arguments is a URL_Struct which contains the actual URL to be retrieved. When a call to NET_GetURL( ) is made, a connection is established between the client making the request and the host machine named in the URL, a request is sent in a particular format specified by the protocol (e.g., http, ftp), and data is received by the client, from the host machine.

In order to resolve host names, netlib uses a standard DNS lookup mechanism. NET_FindAddress( ) makes the gethostbyname( ) call to lookup the IP address for the specified host from a DNS database stored on a DNS server, and is called from NET_BeginConnect( ). If a numeric IP address is passed into NET_FindAddress( ), it is passed directly into the gethostbyname( ) call which will always return success when an IP address is passed in. NET_FindAddress( ) is actually called repeatedly until it returns success or failure. Upon success the host entity struct is filled out, and cached. Upon failure, the host entity struct is freed and the "not found" result is passed back up to the caller.

U.S. Pat. No. 6,023,724 issued on Feb. 8, 2000 by Bhatia, et al., entitled, "Apparatus and methods for use therein for an ISDN LAN modem that displays fault information to local hosts through interception of host DNS request messages" discloses a mechanism through which a fault-specific web page can be dynamically constructed and downloaded to the workstation for subsequent display through a web browser. The page, once rendered, provides a specific message pertinent to the failure. Though improvements are made to generate more specific error messages in response to generalized network failure messages, there is no provision for the redirection of network failure messages to perform other services.

U.S. Pat. No. 6,014,660 issued on Jan. 11, 2000 by Lim, et al., entitled, "Method and apparatus for client-sensitive name resolution using DNS" discloses the steps of receiving a translation request by a DNS server. The DNS server examines the translation request to determine if a record exists within the DNS server. If such a record exists, the IP address is returned as the translation. If not, the requested translation is forwarded to a special DNS server, along with information that identifies the client system requesting translation. Though improvements are made to redirect unresolvable DNS translation requests to special servers for further attempts of translation processing, there is no provision for the redirection of such requests to perform services other than name translation or name resolution.

A domain name includes two parts: a host and a domain. Technically, the letters to the right of the "dot" (e.g., 8-1.com) are referred to as Top Level Domains (TLDs), while hosts, computers with assigned IP addresses that are listed in specific TLD registries are known as second-level domains (SLDs). For the domain name "8-1.com", ".com" is the TLD, and "8-1" is the SLD. Domain name space is the ordered hierarchical set of all possible domain names either in use or to be used for locating an IP address on the Internet. TLDs are known as top-level domains because they comprise the highest-order name space available on the Internet. Second-level domains, as well as third-level domains (3LDs) such as "my.8-1.com", are subsidiary to TLDs in the hierarchy of the Internet's DNS.

There are two types of top-level domains, generic and country code. Generic top-level domains (gTLDs) were created to allocate resources to the growing community of institutional networks, while country code top-level domains (ccTLDs) were created for use by each individual country, as deemed necessary. More than 240 national, or country-code TLDs (e.g., United States (.us), Japan (.jp), Germany (.de), etc.) are administered by their corresponding governments, or by private entities with the appropriate national government's acquiescence. A small set of gTLDs does not carry any national identifier, but denote the intended function of that portion of the domain space. For example, ".com" was established for commercial networks, ".org" for not-for-profit organizations, and ".net" for network gateways. The set of gTLDs was established early in the history of the DNS and has not been changed or augmented in recent years (COM, ORG, GOV, and MIL were created by January 1985, NET in July 1985, and INT was added in November 1988).

The DNS is operated by a Network Information Center (NIC) in each country to act as authority for administering the respective ccTLD zone file portion of the DNS database. The Internet Network Information Center (InterNIC) previously administered by the National Science Foundation (NSF), was formed to preside as authority over the gTLD zone files. In 1993, InterNIC was privatized and Network Solutions Inc. (NSI) was chosen to perform the registration and propagation of these key gTLDs, under a five-year cooperative agreement with the NSF.

Most recently, NSI and officials from the Department of Commerce's National Telecommunications and Information Administration (NTIA) have agreed to a two-year extension of their Cooperative Agreement through Sep. 30, 2000. Included in the extension are provisions to transfer relevant U.S. Government authority over some domain name system functions to a new non-profit corporation. Incorporated and headquartered in California, the Internet Corporation for Assigned Names and Numbers (ICANN) is the non-profit corporation that was formed to take over responsibility for the IP address space allocation, protocol parameter assignment, domain name system management, and root server system management functions now performed under U.S. Government contract by Internet Assigned Numbers Authority (IANA) and other entities. The IANA, also headquartered in California, is the overall authority for day-to-day administration of the DNS. IANA staff carry out administrative responsibilities for the assignment of IP Addresses, Autonomous System Numbers, TLDs, and other unique parameters of the DNS and its protocols.

ICANN, NTIA, and NSI agreed to a migration to a shared registration system (SRS) in a phased approach beginning Mar. 31, 1999 with full implementation by Jun. 1, 1999. NSI has implemented a SRS to support multiple licensed, accredited registrars offering registration services. NSI and other domain name registrars function as retailers of domain name registration services through NSI's SRS. NSI will also continue in its role as the registry or wholesaler of ".com", ".net", and ".org" domain name registrations. To date, NSI has registered more than 7,000,000 domain names, or SLDs, in ".com", ".net", ".org", and ".edu".

Domain name registration for a given NIC authority can be accessed by a TCP/IP application called WHOIS, which queries a NIC database to find the name of network and system administrators, system and network points-of-contact, and other individuals who are registered in appropriate databases. Domain names are identifiers used for both accessing a resource and retrieving contact information of the registrant or domain name holder of that resource. The availability of a domain name from a NIC authority for a given TLD is usually determined by submitting a WHOIS request. If there are no matches in the database then the domain name may be available for registration. Regional WHOIS registries are maintained by NSI and ARIN (American Registry for Internet Numbers) located in the U.S., APNIC (Asia-Pacific Network Information Center) located in Australia, and RIPE NCC located in the Netherlands. Resource location may be determined by resolving a query in the DNS whereas domain name availability may be determined by using a WHOIS service to query an appropriate NIC database.

WIPO Patent Application WO9909726A1 published on Feb. 25, 1999 by Broadhurst, entitled, "Method of determining unavailability of Internet domain names" discloses an improved query server that overcomes the shortcomings of existing domain name searching techniques by performing a multitude of searches simultaneously, transparent to the user. Specifically, the improved query server searches for existing domain name records in various domains and then displays the results in a formatted manner, thus eliminating the need for a user to perform individual searches. However, such improvements do not consider the integration of services other than that of registration.

URLs are used in media and written in documents or typed within e-mail, and data files, etc. as a means to make reference to accessible online content that helps express the context of the ideas one wishes to communicate. URLs are generally written in an abbreviated manner as partial URLs or domain names (e.g., "http://www.example.com" is the URL, "www.example.com" is the FQDN, and "example.com" is the domain name). During the early stages of commercialization on the Internet, businesses displayed the full URL when advertising a commercial or display ad as a means to locate the resources of the business on the Internet. Improvements have been made to recognize partial URLs when entered in the location field of a web browser or network accessible device for automatically appending protocol information so a full URL request can be made. By submitting a domain name or FQDN in the location field, the browser modifies the request by adjusting the partial URL and adding "http://" in front of the domain name or FQDN in order to construct a valid URL. As a result of this convenience, companies have modified their advertising and distribution of URLs through print, film, radio, television and other media as "example.com" or "www.example.com" instead of the URL "http://www.example.com". Though a helpful mnemonic for consumers to more readily identify and access the location and origin of goods and services on a public network such as the Internet, the mnemonic is only applicable when using a command line of a device or location field of a web browser program as a means to access the advertised web site.

The main use of a web browser location field is for resolving URLs to locate and access resources. Entering a URL in the location field of a web browser serves as a means to access a network resource corresponding to that URL. Because the location field is essential for accessing resources, the design of such location fields have rivaled much competition and innovation between existing web browser products from companies such as Netscape and Microsoft. Improvements to better track and organize sites of URLs that users have visited such as Bookmark folders, URL history, and the personal toolbar are all examples of functionality designed to help users navigate. Other improvements include spell checking and an autocomplete feature from the URL history as text is entered into the location field.

A more recent feature called Smart Browsing is integrated into Netscape Navigator that uses Internet Keywords so users can streamline the use of URLs and get fast access to web sites using the browser's location field. Any single or multiword strings typed into the browser's location field that does not include a "." are sent via HTTP to a server at "netscape.com". The keyword server pulls the string and compares it to several separate lists of keyword-URL pairs. If the keyword system finds a match, it redirects the user's browser to the URL of the keyword-URL pair. Failing a match against the lists, the user's browser is redirected to a Netscape Search page with the typed string as the search query. The "." versus " " is a key factor in determining what services are used. Depending on context, the detection of only a "." delimiter implies a domain name used for name resolution and resource location services whereas the detection of only a " " delimiter implies a search request used for directory services and the like.

The autosearch feature of Microsoft Internet Explorer (MSIE) is another example of an improvement to the location field of a web browser. The details of the autosearch feature is disclosed in U.S. Pat. No. 6,009,459 issued on Dec. 28, 1999 by Belfiore, et al., entitled, "Intelligent automatic searching for resources in a distributed environment." The '459 patent specifies a mechanism for a computer system to automatically and intelligently determine what a user intended when the user entered text within the location field of a web browser. Often users improperly enter URLs or enter search terms in a user interface element that requires URLs. If the user enters text that is not a URL, the system may first try to construct a valid URL from the user-entered text. If a valid URL cannot be constructed, the browser then automatically formats a search engine query using the user-entered text and forwards the query to an Internet search engine. In an alternative embodiment of the '459 patent, the passing of search terms to the search engine is not triggered by an improper URL being entered but rather is triggered by the failure to resolve the URL to a web site within a certain time frame due to a heavily used page that cannot be readily accessed.

In addition, the '459 patent specifies a template registry that categorizes the specific suitability of a plurality of search engines to locate web sites related to a determined meaning of the specified text. The template is an entry in the registry that includes replaceable characters that may be replaced with the processed text. An example template registry entry that causes the Yahoo! search engine to be called is "http://msie.yahoo.com/autosearch?%s". The %s is filled in with information regarding the search terms.

Each day hundreds of thousands of users are connecting to the Internet for the first time. These first time users are already familiar with the concept of a domain name or web address such as "example.com" or a URL such as "http:j/www.example.comlindex.html" due to their contact with the myriad of advertisements in print, radio, and television. When a resource such as a web page can not be accessed after entering a web address or URL in the command line of a device or location field of a web browser, novice users of the Internet may assume that the resource does not exist and that the domain name of such a resource is available to the user for registration. This is a common mistake. The domain name may be registered but has no corresponding web site. Availability of the domain name remains unclear until a separate domain name availability request such as a WHOIS request is performed.

In effect, a domain name can be considered an object having the properties of resolvability and availability, wherein methods of resolvability are applied to resource identification and location services and methods of availability are applied to domain name registration services. To date, resource location and domain name availability have remained separate mutually exclusive services. Additional advantages can be obtained by integrating these separate services into a unified service. Accordingly, in light of the above, there is a strong need in the art for a system and method for integrating resource location and domain name registration services.

SUMMARY OF INVENTION

The present invention enables the seamless integration between name resolution and registration services. The invention allows for the extended utility of the command line of a device or location field of a client browser for determining domain name availability to streamline the registration process. The present invention helps novice Internet users to more readily understand the difference between resource location and domain name availability. The invention may use zone file caching and advanced domain name translation lookups to reduce extra bandwidth required by relying on client name resolution services or WHOIS lookups only. The present invention enables various methods of registrar selection by a user or at random each time a browser redirects to registration services, assuring that business is distributed to other registrars. The invention may use the MSIE autosearch feature for the purposes of registration in addition to the purpose of searching in lieu of making browser modifications resulting in the savings of distribution costs for software updates.

In general, in accordance with the present invention a method for requesting a network resource from an identifier having a domain name includes determining that the network resource can not be located, and processing at least a portion of the identifier with one of a search request and registration request.

In another aspect of the present invention a method for requesting a network resource from an identifier having a valid domain name includes the steps of determining whether the network resource can be located, requesting the network resource from the identifier in response to determining that the network resource can be located, and determining whether the valid domain name is available for registration in response to determining that the network resource can not be located.

In accordance with yet additional aspects of the present invention, an apparatus which implements substantially the same functionality in substantially the same manner as the methods described above is provided.

In accordance with other additional aspects of the present invention, a computer program product may be used to perform substantially the same methods as those described above are provided.

The foregoing and other features of the invention are hereinafter fully described and particularly pointed out in the claims. The following description and the annexed drawings set forth in detail one or more illustrative aspects of the invention, such being indicative, however, of but one or a few of the various ways in which the principles of the invention may be employed.

BRIEF DESCRIPTION OF DRAWINGS

FIG. 5a is a diagram depicting an exemplary configuration settings interface in accordance with the present invention for selecting how a URI is redirected.

FIG. 5b presents an exemplary table in accordance with the present invention illustrating the minimum data structure of a registrar database.

FIG. 5c is a flowchart illustrating the step in accordance with the present invention of determining which registrar will process a registration request in response to the determination of an unresolvable URI or domain name.

DETAILED DESCRIPTION

Figure 1A:
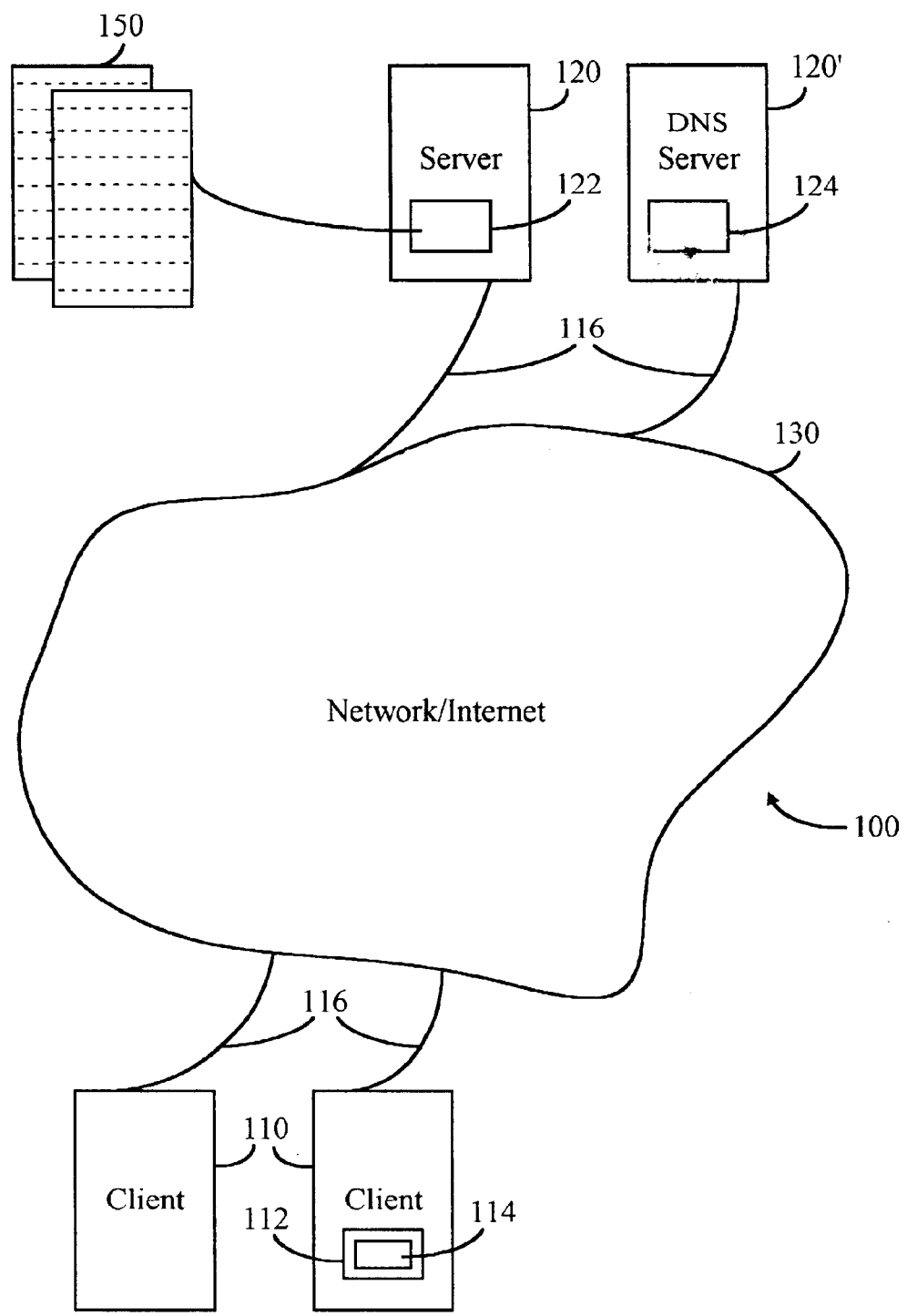
FIG. 1a is a block diagram of an exemplary distributed computer system in accordance with the present invention.

The present invention will now be described with reference to the drawings, wherein like reference numerals are used to refer to like elements throughout.

FIG. 1a illustrates an exemplary system for providing a distributed computer system 100 in accordance with one aspect of the present invention and may include client computers or any network access apparatus 110 connected to server computers 120 via a network 130. The network 130 can use Internet communications protocols (IP) to allow the clients 110 to communicate with the servers 120. The network access apparatus 110 may include a transceiver, modem, or other network interface device to communicate with the electronic network 130. The modem can communicate with the electronic network 130 via a line 116 such as a telephone line, an ISDN line, a coaxial line, a cable television line, a fiber optic line, or a computer network line. Alternatively, the modem can wirelessly communicate with the electronic network 130. The electronic network 130 can be accessed via an on-line service, an Internet service provider, a local area network service, a wide area network service, a cable television service, a wireless data service, an Intranet, a satellite service, or the like.

The client computers 110 can be any network access apparatus including hand held devices, palmtop computers, personal digital assistants (PDAs), notebook, laptop, portable computers, desktop PCs, workstations, and/or larger/smaller computer systems. It is noted that the network access apparatus 110 may have a variety of forms, including but not limited to, a general purpose computer, a network computer, a network television, an internet television, a set top box, a web-enabled telephone (e.g., phone browser), an internet appliance, a portable wireless device, a television receiver, a game player, a video recorder, and/or an audio component, for example.

Each client 110 typically includes one or more processors, memories, and input/output devices. An input device can be any suitable device for the user to give input to client computer 110; for example: a keyboard, a 10-key pad, a telephone key pad, a light pen or any pen pointing device, a touchscreen, a button, a dial, a joystick, a steering wheel, a foot pedal, a mouse, a trackball, an optical or magnetic recognition unit such as a bar code or magnetic swipe reader, a voice or speech recognition unit, a remote control attached via cable or wireless link to a game set, television, or cable box. A data glove, an eye tracking device, or any MIDI device could also be used. A display device could be any suitable output device, such as a display screen, text-to-speech converter, printer, plotter, fax, television set, or audio player. Although the input device is typically separate from the display device, they could be combined; for example: a display with an integrated touchscreen, a display with an integrated keyboard, or a speech-recognition unit combined with a text-to-speech converter.

The servers 120 can be similarly configured. However, in many instances server sites 120 include many computers, perhaps connected by a separate private network. In fact, the network 130 may include hundreds of thousands of individual networks of computers. One aspect of the present invention includes a specific type of server system 120 called a DNS server system 120' which stores in memory a DNS database 124 having DNS records that translate domain names into IP addresses and vice versa. The DNS server system 120' is connected 116 to a network 130.

The DNS is a distributed database (of mappings) 124 implemented in a hierarchy of DNS servers (name servers) 120' and an application-layer protocol that allows hosts and name servers to communicate in order to provide the translation service. Name servers 120' are usually UNIX machines running BIND software. In order to deal with an issue of scale of the Internet, the DNS uses a large number of name servers 120', organized in a hierarchical fashion and distributed around the world. No single name server 120' has all of the mappings 124 for all of the hosts in the Internet. Instead, the mappings 124 are distributed across many name servers 120'.

Although the client computers 110 are shown separate from the server computers 120, it should be understood that a single computer can perform the client and server roles. Those skilled in the art will appreciate that the computer environment 100 shown in FIG. 1a is intended to be merely illustrative. The present invention may also be practiced in other computing environments. For example, the present invention may be practiced in multiple processor environments wherein the client computer includes multiple processors. Moreover, the client computer need not include all of the input/output devices as discussed above and may also include additional input/output devices. Those skilled in the art will appreciate that the present invention may also be practiced with Intranets and more generally in distributed environments in which a client computer requests resources from a server computer.

During operation of the distributed system 100, users of the clients 110 may desire to access information records 122 stored by the servers 120 while utilizing, for example, the Web. The records of information 122 can be in the form of Web pages 150. The pages 150 can be data records including as content plain textual information, or more complex digitally encoded multimedia content, such as software programs, graphics, audio signals, videos, and so forth. It should be understood that although this description focuses on locating information on the World-Wide-Web, the system can also be used for locating information via other wide or local area networks (WANs and LANs), or information stored in a single computer using other communications protocols.

The clients 110 can execute Web browser programs 112, such as Netscape Navigator or MSIE to locate the pages or records 150. The browser programs 112 enable users to enter addresses of specific Web pages 150 to be retrieved. Typically, the address of a Web page is specified as a URI or more specifically as a URL. In addition, when a page has been retrieved, the browser programs 112 can provide access to other pages or records by "clicking" on hyperlinks to previously retrieved Web pages. Such hyperlinks may provide an automated way to enter the URL of another page, and to retrieve that page.

A client of the DNS is called a resolver 114. Resolvers 114 are typically located in the application layer of the networking software of each TCP/IP capable machine. Users typically do not interact directly with the resolver 114. Resolvers 114 query the DNS by directing queries at name servers, which contain parts of the distributed database that is accessed by using the DNS protocols to translate domain names into IP addresses needed for transmission of information across the network. DNS is commonly employed by other application-layer protocols—including HTTP, SMTP and FTP—to translate user-supplied domain names to IP addresses. When a browser program 112 (e.g., an HTTP client), running on a user's machine, requests a URL having a resolvable domain name, in order for the user's machine to be able to send an HTTP request message to a server 120, the user's machine must obtain the IP address of the domain name. The user machine then runs the resolver 114 (DNS client) on the client-side of the DNS application. The browser 112 extracts the domain name from the URL and passes the domain name to the resolver 114 on the client-side of the DNS application. As part of a DNS query message, the DNS client 114 sends the domain name to a DNS server system 120' connected to the Internet. The DNS client 114 eventually receives a reply, which includes the IP address for the domain name. The browser then opens a TCP connection 116 to the HTTP server process 120 located at the IP address.

Figure 1B:
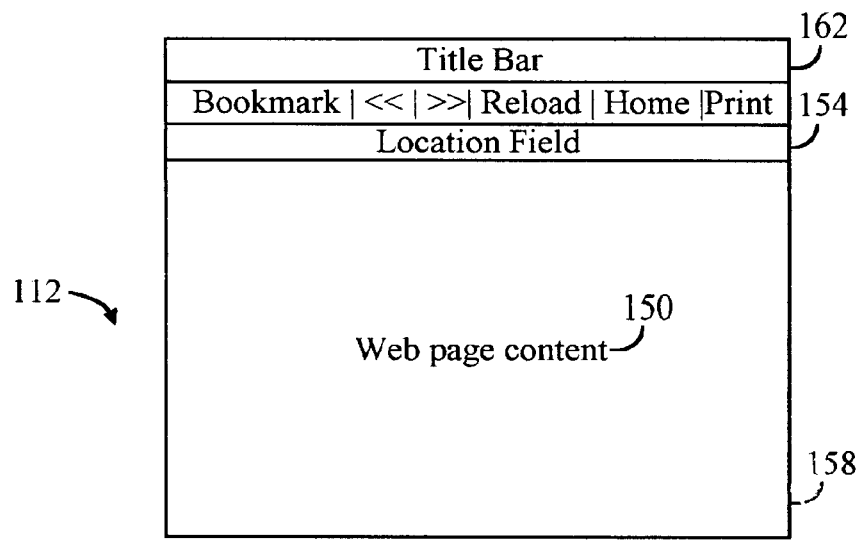
FIG. 1b is a diagram depicting the location field used in a conventional web browser.

FIG. 1b more specifically illustrates an exemplary selection of common operative components of a web browser program 112. The web browser 112 enables a user to access a particular web page 150 by typing the URL for the web page 150 in the location field 154. The web page 150 content corresponding to the URL in the location field 154 may be displayed within the client area of the web browser display window 158, for example. Title information from the web page 150 is displayed in the title bar 162 of the web browser 112.

Figure 1C:
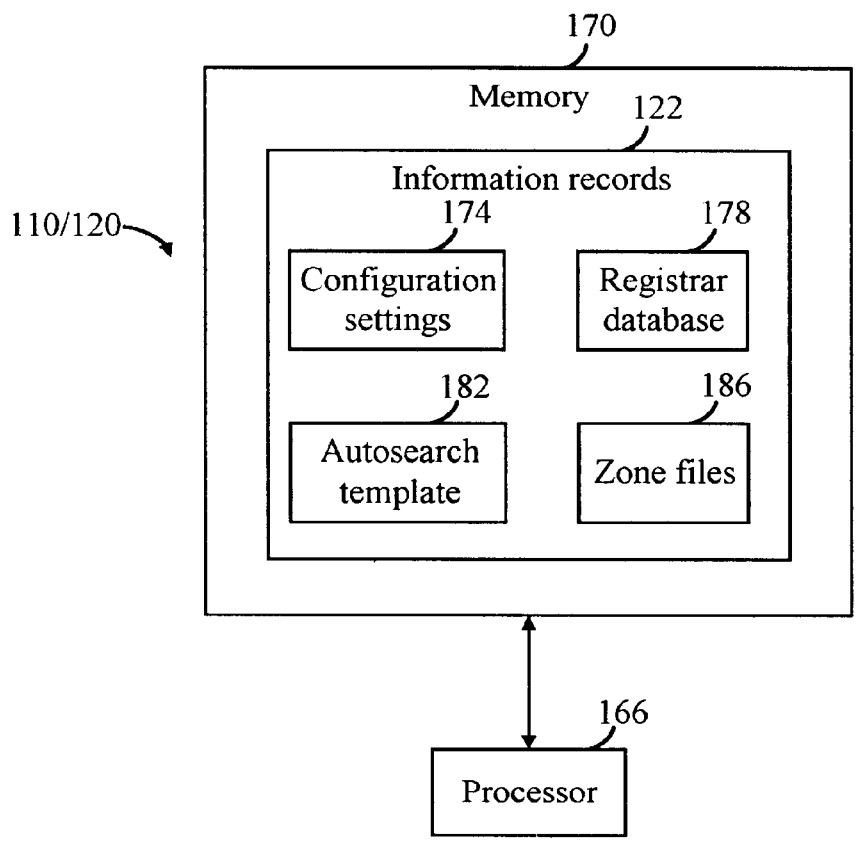
FIG. 1c is a block diagram illustrating exemplary information records stored in memory in accordance with the present invention.

FIG. 1c illustrates a block diagram of a processor 166 coupled to a storage device such as memory 170 in a client 110 or server 120 computing system. Stored in memory are information records 122 having any combination of exemplary content such as lists, files, and databases. Such records may include: configuration setting information 174, registrar database 178, zero or more autosearch templates 182, and zero or more zone file caches 186. These information records are further introduced and discussed in more detail throughout the disclosure of this invention.

Figure 2A:
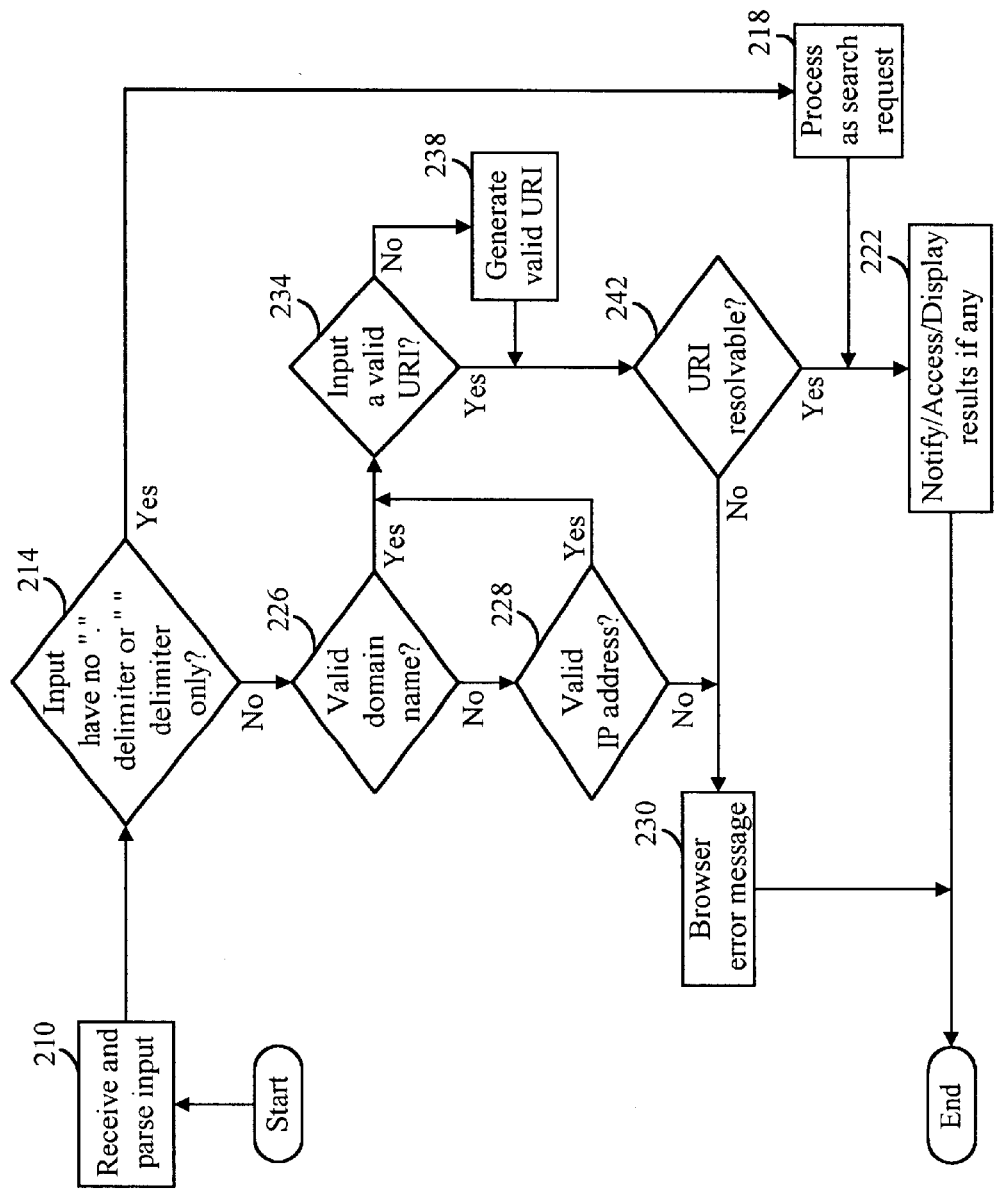
FIG. 2a is a flowchart illustrating the steps performed by a prior art system for resource location services.

FIG. 2a is a top level flowchart illustrating the steps of an exemplary prior art system for requesting a network resource from an identifier by processing resource location services. A network access apparatus 110, servlet, applet, stand-alone executable program, command line of a device such as a phone browser, or user interface element such as a text box object or location field 154 of a web browser 112, may receive and parse input such as text in step 210. Tests are then performed to determine how to process the received input 210. For instance, when it is determined in step 214 that input 210 has no "." delimiters or " " delimiters only, it becomes clear that there is no domain name or IP address present and the input 210 is processed as a search request in step 218. Results, if any, are then notified, accessed, and/or displayed in step 222. When the presence of the "." delimiter is determined in step 214, the input may include either an IP address or a domain name. When a domain name is parsed, the validity of the domain name is determined in step 226. Validity of URI syntax is explained in T. Berners-Lee, "Informational RFC (Request for Comment) 1630: Universal Resource Identifiers in WWW—A Unifying Syntax for the Expression of Names and Addresses of Objects on the Network as used in the World-Wide Web", Internet Engineering Task Force (IETF), June 1994, "http://www.faqs.org/rfcs/rfc1630.html".

If the parsed domain name is determined in step 226 to be not valid, a browser error message is displayed in step 230. In turn, when an IP address is parsed, the validity of the IP address is determined in step 228. If the IP address is determined in step 228 to be not valid, a browser error message is displayed in step 230. When a domain name is determined valid in step 226 or an IP address is determined valid in step 228, it is then further determined in step 234 whether input 210 includes a valid URI. If there is no valid URI, then a valid URI is generated in step 238 from input 210. For instance, if a scheme is missing, the web browser may add the prefix "http://" to the text or another scheme prefix. After performing input validity tests, the steps of resolvability are performed. When a received 234 or generated 238 valid URI is determined resolvable in step 242, then results, if any, are then either notified, accessed, and/or displayed in step 222. However, when a valid URI is determined not resolvable in step 242, a browser error message is displayed in step 230. In other browser configurations, in one aspect of the present invention, the unresolvable URI can be processed as a search request in an attempt to yield results other than that of an error message in step 230.

One example of such a system is when a domain name (e.g., "example.com") is entered into a location field 154 of a web browser program such as MSIE. The MSIE browser generates a URI (e.g., "http://www.example.com") from the domain name. If the domain name is resolvable (the domain name can be successfully translated into its corresponding IP address as discussed in conjunction with FIG. 2b) then the web browser attempts to access content from a web server corresponding to the URI. If the domain name is not resolvable, then the input is passed and the following URI is generated:
"http://auto.search.msn.com/response.asp?MT=example.com&srch=&prov=&utf8"

The "." is one delimiter of the DNS system whereas the " " is one delimiter of plain text language. When a keyword search is provided as input, (e.g., "search example") it is determined that DNS name resolution is unnecessary and the input is immediately redirected to the Microsoft Network (MSN) Autosearch feature. In effect, all input that can not be successfully resolved/searched is redirected to the server at "auto.search.msn.com" and redirected accordingly as either an error message or search request. The Netscape Navigator browser program does not provide additional processing when a domain name is not resolvable, and instead, displays the following error message: "Browser is unable to locate the server: example.com The server does not have a DNS entry. Check the server name in the Location (URL) and try again."

Figure 2B:
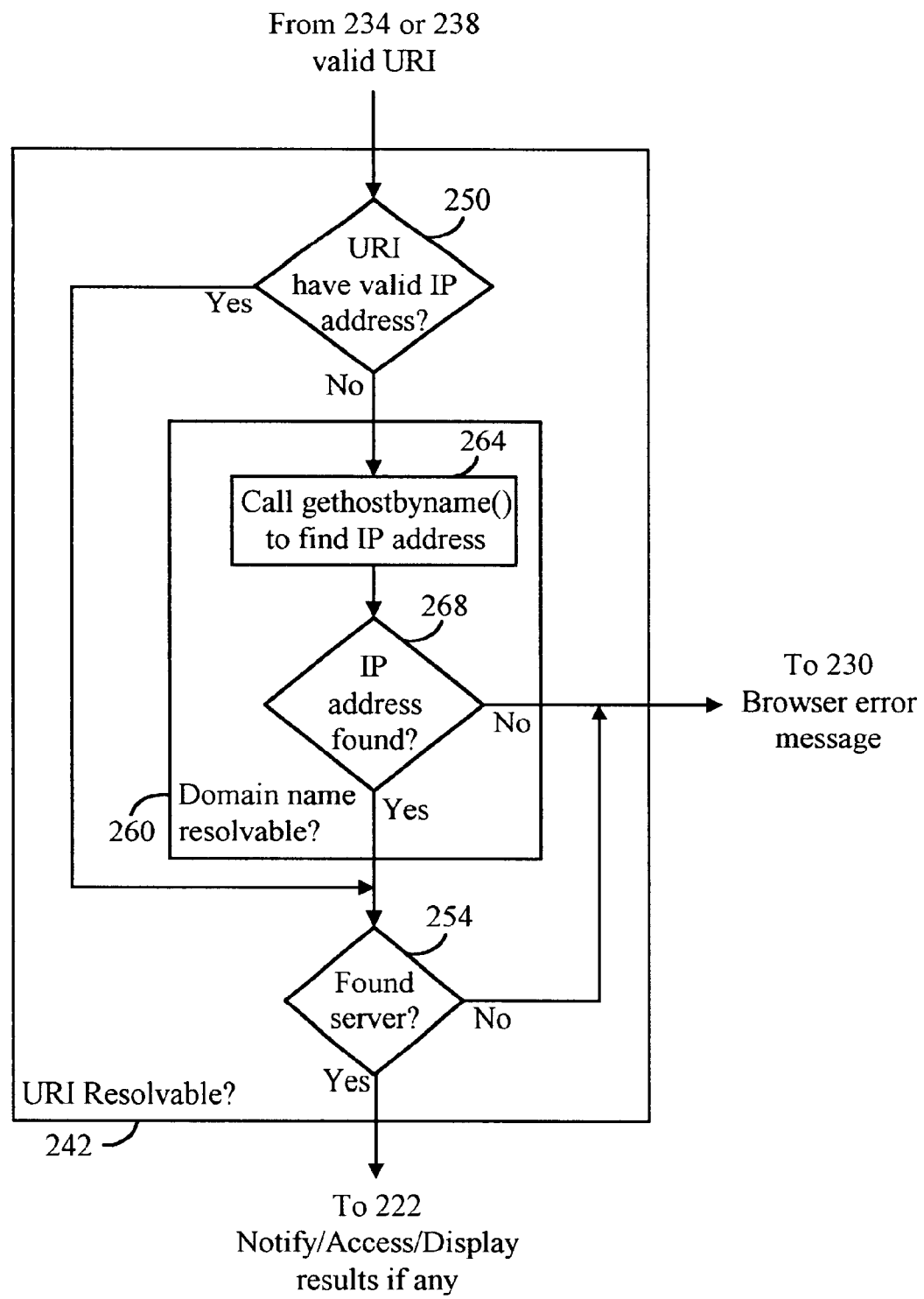
FIG. 2b is a flowchart illustrating the steps performed by a prior art system for determining URI resolvability.

FIG. 2b more specifically illustrates steps that are performed for determining URI resolvability (step 242). If the URI is determined in step 250 to include a valid IP address, then a request is submitted to access the server located at the IP address. When the server is found in step 254 and accessed, results, if any, are then notified, accessed, and/or displayed in step 222. However, if the server is not found in step 254, a browser error message is displayed in step 230. When the URI includes a valid domain name, then the resolvability of the domain name is determined in step 260. Domain name resolution is explained in P. Mockapetris, "Informational RFC (Request for Comment) 1035: Domain Names—Implementation and Specification", Internet Engineering Task Force (IETF), November 1987, "http://www.faqs.org/rfcs/rfc1035.html".

Specific steps for the determination of domain name resolvability (step 260) include issuing a function call in step 264 from the web browser 112 to gethostbyname( ) from the resolver library 114 to translate the domain name into its corresponding IP address from the DNS database 124 of a DNS server system 120'. When gethostbyname( ) returns a NULL pointer in step 264, then it is determined in step 268 that no IP address is found and a browser error message is displayed in step 230. However, when an IP address is found in step 268, then a request is submitted to access the server located at the IP address. When the server is found in step 254 and accessed, results, if any, are then notified, accessed, and/or displayed in step 222. However, if the server is not found in step 254, a browser error message is displayed in step 230.

As discussed, domain names are primarily processed by either name resolution or resource location services and are also processed by registration services as well. When a domain name is received as input to a registration service, the availability of the domain name is determined. If the domain name is not available, registrant information is returned and the client is notified that the domain name in question is not available and provides the further option of checking the availability of other domain names. When the domain name is available, the user is presented with the choice of registering the domain name. Upon completion of registration, another domain name can be checked for availability.

Figure 3A:
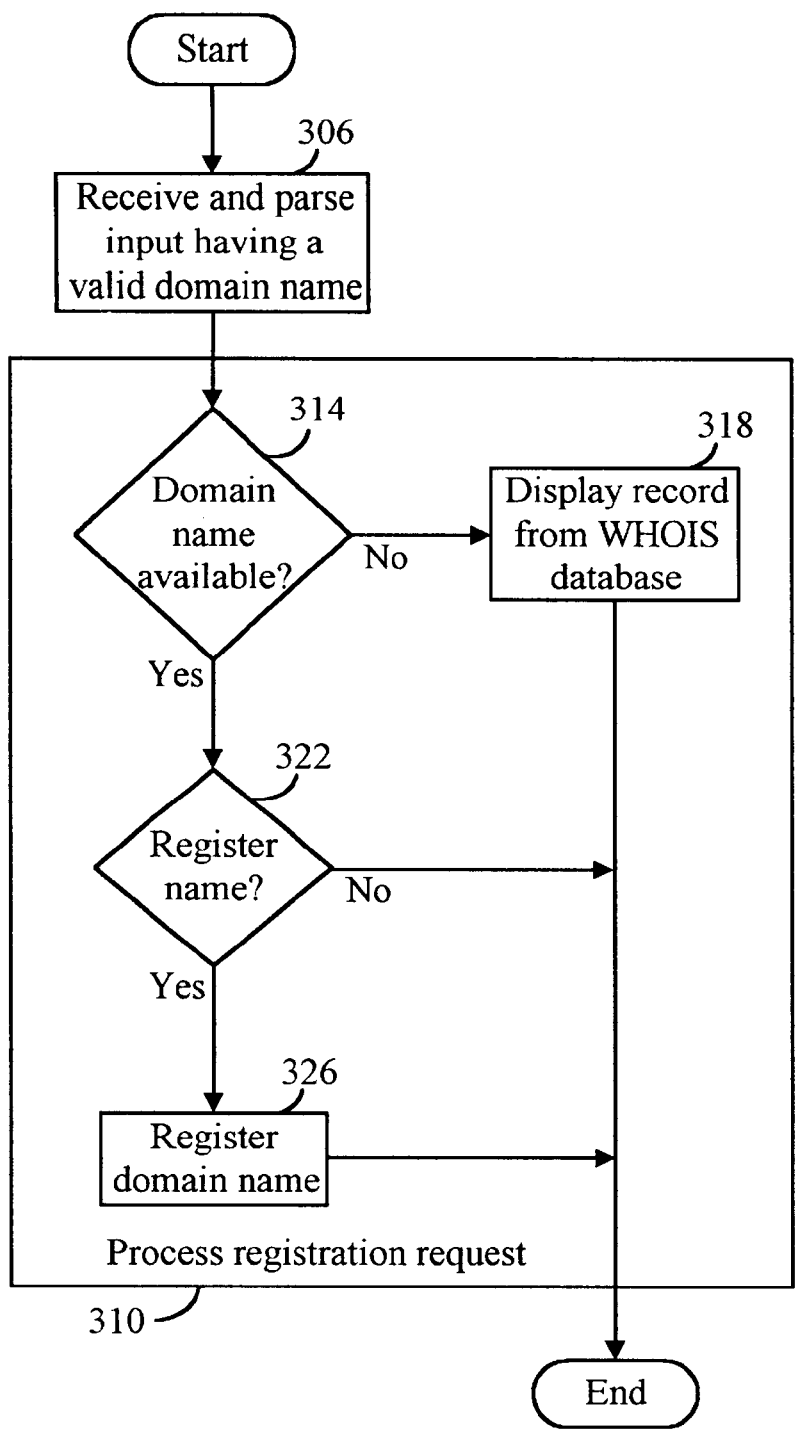
FIG. 3a is a flowchart illustrating the steps performed by a prior art system for registering a domain name.

FIG. 3a illustrates such a registration service. A device, network access apparatus 110, servlet, applet, stand-alone executable program, or a user interface element such as a text box object, receives and parses input having a valid domain name in step 306. The valid domain name is then processed as a registration request in step 310. To process such a request, availability of the domain name 306 is determined in step 314. If the domain name 306 is determined to be not available in step 314, then a record from a corresponding WHOIS database is retrieved and displayed in step 318. However, when the domain name 306 is determined available in step 314, then such information is displayed, accordingly prompting the user in step 322 to register the domain name. When it is determined in step 322 the user would like to register the domain name 306, further information is displayed to assist the user in registering the domain name in step 326. Specification of the WHOIS protocol is provided in K. Harrenstien, M. Stahl, and E. Feinler, "Informational RFC (Request for Comment) 954: NICNAME/WHOIS", Internet Engineering Task Force (IETF), October 1985, "http://www.faqs.org/rfcs/rfc954.html".

Figure 3B:
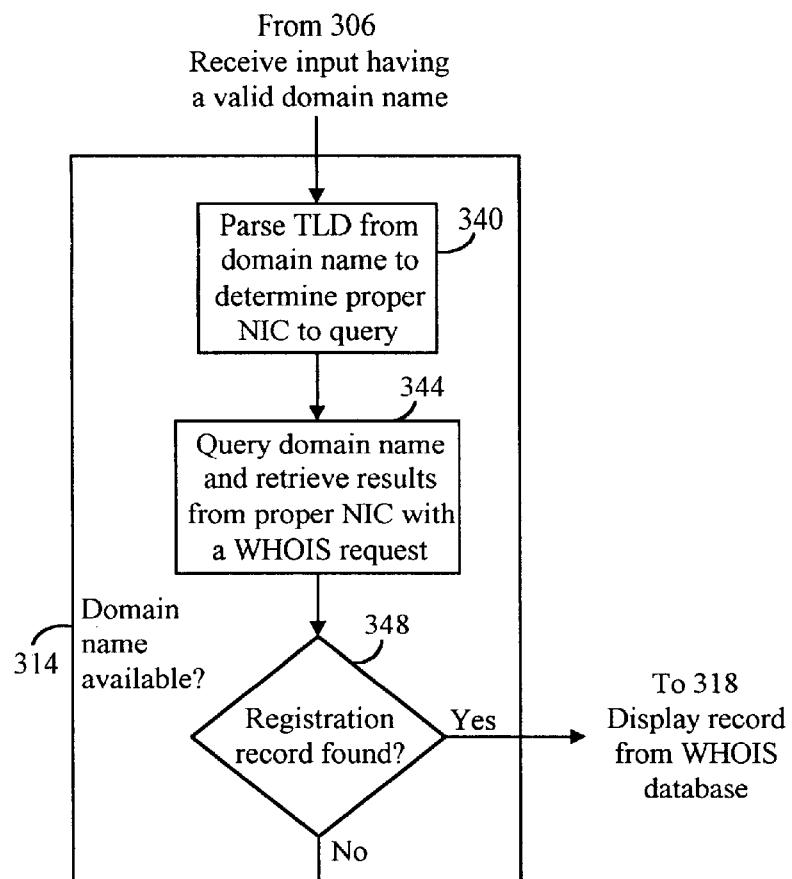
FIG. 3b is a flowchart illustrating the steps performed by a prior art system for determining domain name availability.
Figure 3C:
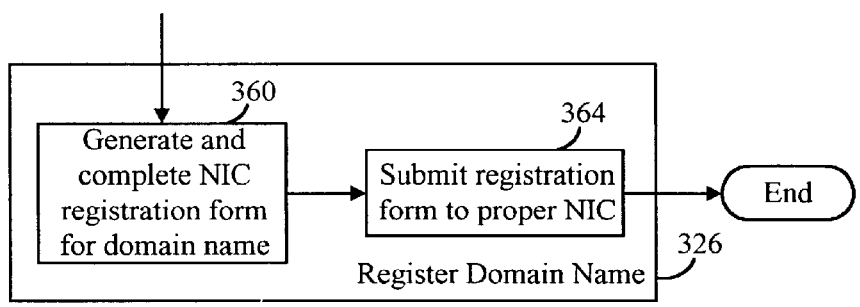
FIG. 3c is a flowchart illustrating the steps performed by a prior art system for registering a domain name.

FIG. 3b more specifically illustrates steps that are performed for determining domain name availability (step 314). A TLD is parsed in step 340 from the valid domain name 306 to determine which NIC to query. A WHOIS request of the domain name 306 is submitted in step 344 to the proper NIC and query results are retrieved. When a registration record is found in step 348, the record is displayed in step 318 from the WHOIS database, otherwise the user is prompted in step 322 to register the domain name. FIG. 3c more specifically illustrates steps for registering the domain name in step 326. When it is determined in step 322 that the user would like to register the domain name in step 326, the user completes a NIC registration form in step 360. The form is then submitted in step 364 to the proper NIC authority for processing.

Figure 4A:
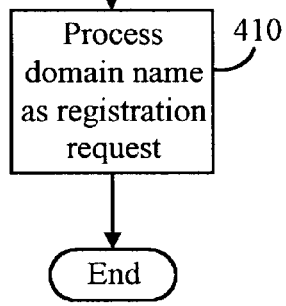
FIG. 4a is a top level flowchart illustrating the step performed of processing a registration request in response to the determination of an unresolvable URI or domain name in the preferred embodiment of the present invention.

FIG. 4a is a top level flowchart showing a new combination of steps in accordance with the present invention for the processing of resource location services. As discussed in FIG. 2a when a valid URI having a valid domain name generated in step 238 or received as input in step 234, the resolvability of the URI is then determined in step 242. As previously explained and shown in FIG. 2b, one step in determining URI resolvability is the determination of domain name resolvability in step 260. Rather than, or in addition to displaying an error message in step 230 or processing a search request in step 218 in response to the determination of an unresolvable URI (step 242) or domain name (step 260), in a preferred embodiment of the present invention the unresolvable URI is instead redirected to registration services where the unresolvable domain name is automatically used to perform a registration request in step 410 to determine domain name availability in step 314. When the domain name is determined available (as in step 314), a registration form is displayed (as in step 360) as a result of processing the registration request in step 410.

Figure 4B:
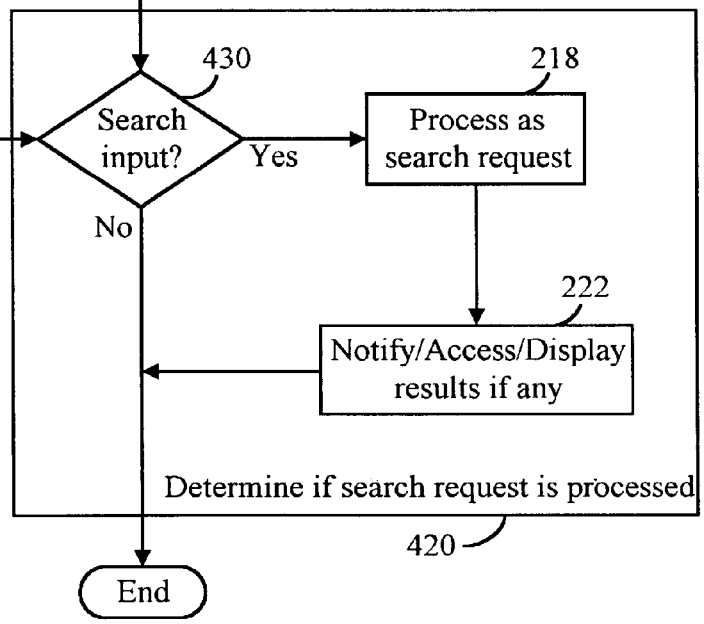
FIG. 4b is a flowchart illustrating the steps performed for further integrating registration services with both resource location services and search services in accordance with the present invention.

FIG. 4b is a flowchart illustrating additional steps for further integration of resource location and registration services. After the registration request is processed in step 410, or in response to the determination of an unresolvable URI (step 242) or domain name (step 260), it is determined in step 420 whether a search request is processed. More specifically, it is further determined in step 430 whether received input 210 is to be processed as a search request in step 218. When this is the case, a search request is constructed from the identifier (e.g., domain name) and processed in step 218 and results, if any, are then notified, accessed, and/or displayed in step 222.

FIG. 5a illustrates user modifiable configuration settings 174, which may be accessed by the browser for selecting the user preferred URI redirection in response to the determination of an unresolvable domain name. Configuration settings 174 may allow choice of URI redirection to either the least cost registrar (discussed in conjunction with FIG. 5b), a list of registrars that can be selected at the time of redirection, the selection of a random registrar, or the redirection of a predetermined or default registrar. Offering such selection features can assure that the redirection to registration services are better distributed to those accredited registrars using the SRS.

FIG. 5b illustrates the minimum data structure of a registrar database 178 including registrar 524 and price/cost 528. When least cost registrar is chosen from configuration settings 174, consulting from a table of registration cost information is performed by accessing the registrar database to select one or more records indicating the lowest price for the purchase of a domain name. Additional table entries may be included such as rates, time and expiration date (e.g., length of purchase time before renewal), quantity, and customized discount methods, etc. Real-time price changes, may be provided to the registrar database for price updates based upon surveys, bidding, bulk discounts, purchasing more time, offers, rebates, supply and demand, etc. In the case, where more than one record is selected (e.g., many registrars competing for the same lowest price), the client machine is redirected at random to those qualifying registrars. In addition, when select registrar is chosen from configuration settings 174, a list box is generated from the registrar database 178 at the time of redirection for the user to select a registrar from.

FIG. 5c illustrates the additional optional step of determining a redirection method (step 540). Redirection can be determined in step 540 by retrieving configuration settings 174 in response to the determination of an unresolvable URI (step 242) or domain name (step 260) and before a registration request is processed in step 410. Redirection can also be determined in step 540 by accessing a template 182 from the MSIE autosearch feature either in response to retrieving a redirection method in step 540 or in response to the determination in step 260 (FIG. 2b) of an unresolvable domain name. The template is used to generate a valid URI for redirecting the client (e.g., web browser) to a registrar for processing a registration request (step 410). Furthermore, after the registration request is processed in step 410, it is determined in step 420 whether a search request is processed.

Those skilled in the art can make and use a computer program separate from all others, may be a part of an operating system, or may be a plug-in for web browser 112. Such a program can be downloaded and installed for integration into the command line of a device or location field 154 of a browser program 112. Modifying the source code of the browser program 112 itself may be more desirable, in effect, enabling tens of millions of users to take advantage of integrated name resolution and registration services. In the case of MSIE, modifications can be made to the script on the server "auto.search.msn.com" that generates the "response.asp" web page and all unresolved domain names can be redirected to a licensed registrar rather than processed as a search request. An extra template is created and used in the registry of the MSIE autosearch feature. The template can further include which server to access for transparently performing a WHOIS request and/or access the server of a desired registration service of an accredited registrar to perform such a registration request.

There are numerous WHOIS CGI scripts in the public domain that can be used by those skilled in the art to perform WHOIS requests. A listing of such scripts can be accessed from the following URL.
"http://cgi.resourceindex.com/Programs_and_Scripts/Perl/Internet_Utilities/Whois"

In one example, the template can enable redirection to transparently perform a domain name query as discussed in WIPO Patent Application WO9909726A1 published on Feb.

25, 1999 by Broadhurst, entitled, "Method of determining unavailability of internet domain names".

By using an extra template, the browser program does not have to be modified, thereby eliminating distribution costs for a browser or plug-in version update. For instance, when a domain name (e.g., thisnameismostprobablyavailable.com) is determined unresolvable, an extra name/value pair is passed generating the following URI:
"http://auto.search.msn.com/response.asp?MT=thisnameismostprobablyavailable.com&srch=3&prov=&utf8&reg=licensedregistrar.com"

A specific template is accessed when the name/value pair "reg=licensedregistrar.com" is parsed and passed as a variable. The accessed URI performs a WHOIS request transparent to the user to determine domain name availability. When the domain name is determined available, the domain name is inserted into the accessed template to generate the URI:
"http://www.licensedregistrar.com/cgi-bin/purchase/register.cgi?name=thisnameismostprobablyavailable.com&refer=msie"

The name/value pair "refer=msie" is parsed and passed as a variable to determine the source of the URI redirection for the purposes of billing, tracking, and accounting. For instance, price discounts can be applied to those registrants who purchase domain names from a registrar as a result of redirection, instead of purchasing directly from the same registrar at the regular price. In effect, such a price discount offers incentive for potential registrants to learn about this new method of registering domain names. Other name/value pairs can also be passed to determine whether the output is redirected to registration services, search services, or both, etc.

Because of the extended functionality provided in one aspect of the present invention, a user can now determine domain name availability directly from the command line of a network access device 110 or location field 154 of a browser program 112. Though domain name availability can also be determined by processing a WHOIS request before the step of determining domain name resolvability, this is not a preferred method because it requires the utilization of unnecessary bandwidth. Standard network utility packages such as PING, NSLOOKUP, DIG, HOST to name a few can also be used to determine domain name resolvability. These tools can be modified to provide other means for host/address translation.

Because DNS lookups and WHOIS requests are so heavily relied on, methods for minimizing network bandwidth of these services are considered preferable. For instance, the resolver library and/or client browser 112 may be configured to first access a zone file cache 186 to increase host/address translation lookup performance. A domain name that can not be translated into an IP address implies that a domain name is available and therefore the step of performing a WHOIS request does not have to be relied on. However, due to DNS server time-outs or the propagation of DNS record updates, the results of retrieving if at all, a corresponding translated IP address may be affected. Therefore it is desired to rely on the step of performing a WHOIS request for the purpose of verification in real-time that a domain name determined unresolvable is truly available. Modifications for URI redirection in response to the determination of an unresolvable domain name to registration services such as to an accredited registrar can be made to either the resolver library, client browser, or any server that processes a name resolution request.

The invention does not rely upon the browser's location field 154. For instance, the location field 154 of the web browser can be suppressed and a web page based location field 154 can be displayed. A CGI script is then used to process the input in step 210 and redirect the browser 112 to the appropriate registrar. In lieu of either exclusive, user selected, least cost, or random registrar redirection of services, the completed NIC registration form can be sent to such a registrar and processed in a way that is transparent to the user and does not interfere with the current user's on-line navigational session.

The same teachings can be applied to those skilled in the art by providing a text box object as input that can be located anywhere and on any web page including a text box that is embedded or part of an on-line advertisement. The text box object can be used in a stand-alone application and stored on magnetic and/or optical media that is either non-volatile, writable, removable, or portable. The text box object can be incorporated as an applet or servlet and embedded in other applications. The text box can be integrated in the task bar or any part of the GUI's OS, or the OS bypassed and overlaid as a graphic on a display device based on modifications to a video card and/or it's associated firmware or software drivers. The command line text box can be further overlaid as an interactive object in other embodiments such as Internet television, cable television, digital television, or interactive television through an Internet appliance or set top box.

Although the invention has been shown and described with respect to a certain preferred aspect or aspects, it is obvious that equivalent alterations and modifications will occur to others skilled in the art upon the reading and understanding of this specification and the annexed drawings. In particular regard to the various functions performed by the above described items referred to by numerals (components, assemblies, devices, compositions, etc.), the terms (including a reference to a "means") used to describe such items are intended to correspond, unless otherwise indicated, to any item which performs the specified function of the described item (e.g., that is functionally equivalent), even though not structurally equivalent to the disclosed structure which performs the function in the herein illustrated exemplary aspect or aspects of the invention. In addition, while a particular feature of the invention may have been described above with respect to only one of several illustrated aspects, such feature may be combined with one or more other features of the other aspects, as may be desired and advantageous for any given or particular application.

The description herein with reference to the figures will be understood to describe the present invention in sufficient detail to enable one skilled in the art to utilize the present invention in a variety of applications and devices. It will be readily apparent that various changes and modifications could be made therein without departing from the spirit and scope of the invention as defined in the following claims.

What is claimed is:

1. A method for a requestor requesting a network resource from an identifier having a domain name comprising:
   determining that one of a network resource corresponding to the identifier can not be accessed from a resource location request and domain name can not be resolved from a domain name resolution request; and,
   providing the requester with an ability to access a domain name registration service.

2. The method, as set forth in claim 1, wherein said determining that the network resource corresponding to the identifier can not be accessed from said resource location request includes determining whether the domain name is resolvable.

3. The method, as set forth in claim 2, wherein said determining whether the domain name is resolvable includes attempting to translate the domain name into a corresponding IP address.

4. The method, as set forth in claim 3, wherein said attempting to translate the domain name into said corresponding IP address includes accessing one of a zone file, cache, and DNS server.

5. The method, as set forth in claim 1, wherein said providing the requestor with the ability to access said domain name registration service includes accessing said domain name registration service in response to said determining that one of a network resource corresponding to the identifier can not be accessed from said resource location request and domain name can not be resolved from said domain name resolution request.

6. The method, as set forth in claim 1, further including determining which domain name registration service of a plurality of domain name registration services will be accessed.

7. The method, as set forth in claim 1, further including performing a domain name registration request from said domain name registration service.

8. The method, as set forth in claim 7, wherein said performing said domain name registration request includes determining whether the domain name is available for registration.

9. The method, as set forth in claim 8, wherein said determining whether the domain name is available for registration includes performing a WHOIS request.

10. The method, as set forth in claim 8, further including presenting a registration form when the domain name is determined available for registration, and presenting registrant contact information when the domain name is determined not available for registration.

11. The method, as set forth in claim 8, further including determining which registrar of a plurality of registrars will determine whether the domain name is available for registration.

12. The method, as set forth in claim 11, wherein said determining which registrar of a plurality of registrars will determine whether the domain name is available for registration includes retrieving one of a default named registrar and method of selecting a registrar.

13. The method, as set forth in claim 12, wherein said retrieving one of a default named registrar and method of selecting a registrar retrieves said method of selecting a registrar from one of a template, operating system registry, and modifiable configuration settings.

14. The method, as set forth in claim 13, further including accessing said template from an automatic search.

15. The method, as set forth in claim 13, wherein said method of selecting a registrar is chosen from a least cost registrar, a preselected list of registrars, and a random choice of registrar.

16. The method, as set forth in claim 15, wherein said method of selecting said least cost registrar includes consulting a table of registration cost information updated in real time.

17. The method, as set forth in claim 7, further including determining whether to process a search request either before, during, or after performing said domain name registration request.

18. The method, as set forth in claim 17, wherein said determining whether to process said search request includes determining if a search may be constructed from said at least a portion of the identifier.

19. The method, as set forth in claim 18, further including constructing a search from said at least a portion of the identifier determined to allow a search, processing said search constructed from said at least a portion of the identifier, and presenting the results of said search constructed from said at least a portion of the identifier.

20. The method, as set forth in claim 1, further including inputting the identifier from a user interface element.

21. The method, as set forth in claim 20, wherein said inputting the identifier from a user interface element includes inputting the identifier into one of a one of a browser location field, text box object, command line, speech to text interface, optical recognition interface, and magnetic recognition interface.

22. The method, as set forth in claim 1, wherein said providing the requestor with the ability to access said domain name registration service includes performing an automatic search adapted to access said domain name registration service.

23. The method, as set forth in claim 1, wherein the identifier is a uniform resource locator.

24. The method, as set forth in claim 1, wherein the identifier is the domain name.

25. An apparatus for a requestor requesting a network resource from an identifier having a domain name comprising:

a processor;

a memory coupled to said processor;

means for accessing a network;

means for determining that one of a network resource corresponding to the identifier can not be accessed from a resource location request and domain name can not be resolved from a domain name resolution request; and, means for providing the requestor with an ability to access a domain name registration service.

26. A computer program product for a requestor requesting a network resource from an identifier having a domain name comprising computer readable program code stored on a computer readable medium, the program code adapted to execute the method for determining that one of a network resource corresponding to the identifier can not be accessed from a resource location request and domain name can not be resolved from a domain name resolution request, and providing the requestor with an ability to access a domain name registration service.

* * * * *